No. 885,585. PATENTED APR. 21, 1908.
J. P. CARPENTER.
COMBINATION STEERING AND DRIVING AXLE FOR MOTOR VEHICLES.
APPLICATION FILED OCT. 14, 1907.
2 SHEETS—SHEET 1.
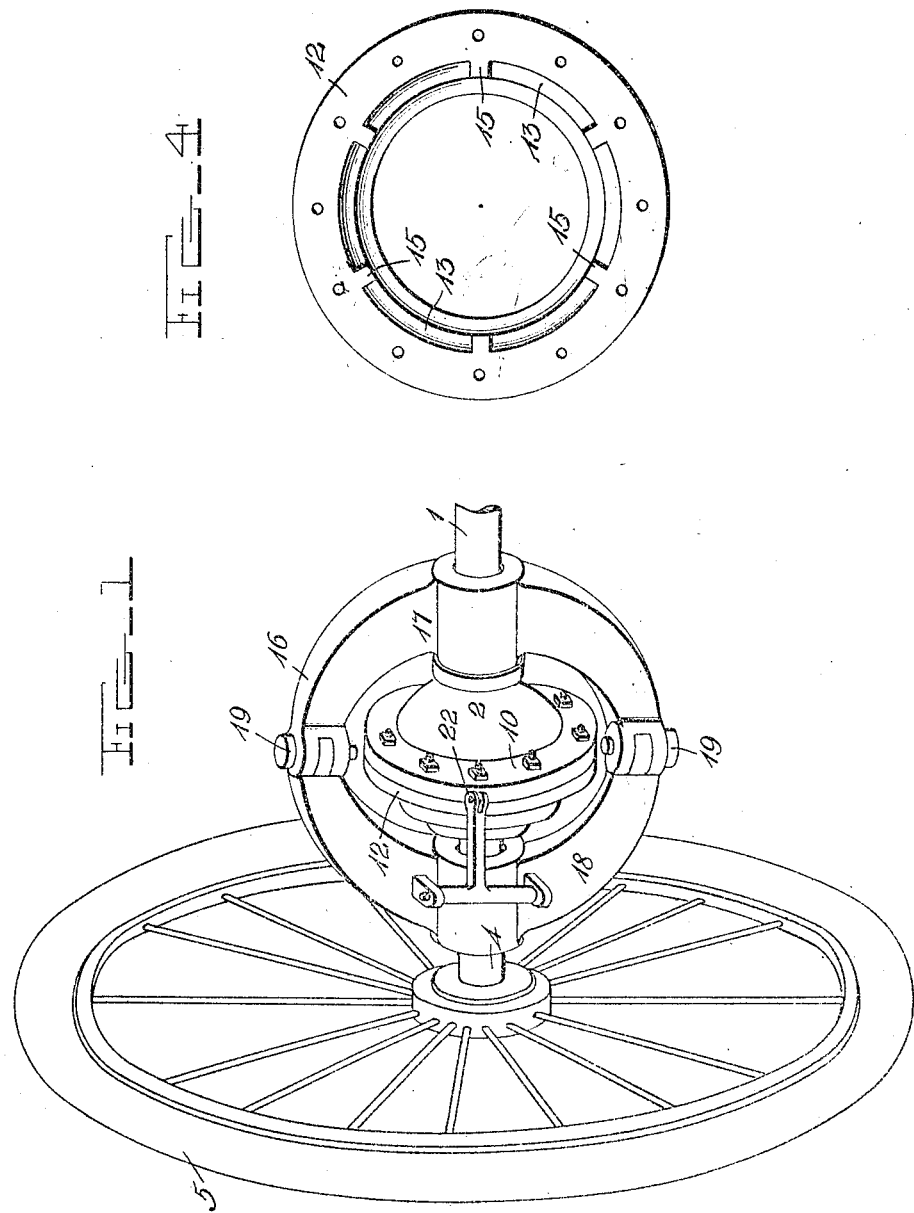
Witnesses
C. H. Griesbauer.
Inventor
J. P. Carpenter
by H. B. Willson & Co.
Attorneys

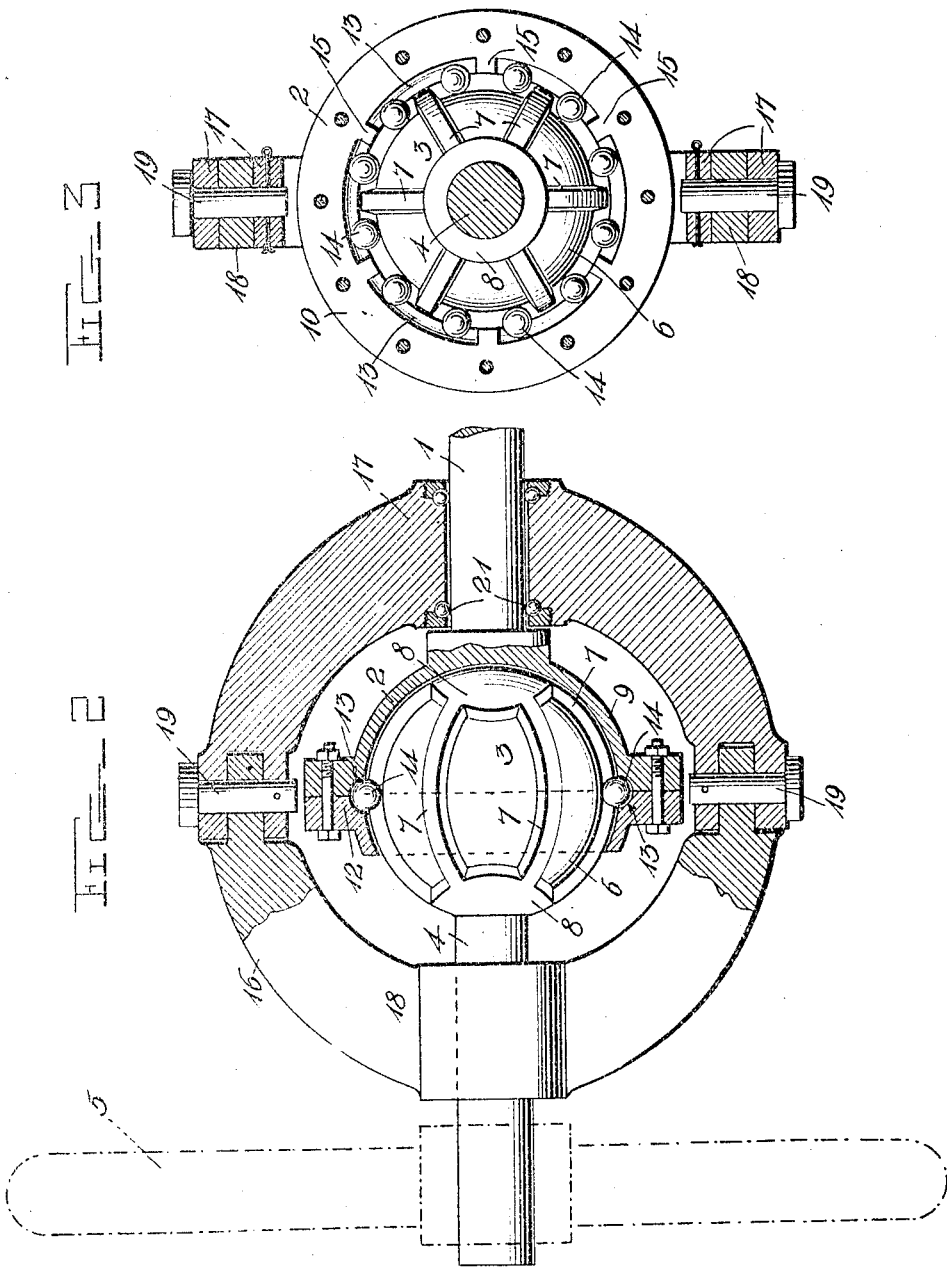

UNITED STATES PATENT OFFICE.

JAMES P. CARPENTER, OF ITHACA, MICHIGAN.

COMBINATION STEERING AND DRIVING AXLE FOR MOTOR-VEHICLES.

No. 885,585.

Specification of Letters Patent.

Patented April 21, 1908.

Application filed October 14, 1907. Serial No. 397,426.

*To all whom it may concern:*

Be it known that I, JAMES P. CARPENTER, a citizen of the United States, residing at Ithaca, in the county of Gratiot and State of Michigan, have invented certain new and useful Improvements in Combination Steering and Driving Axles for Motor-Vehicles; and I do declare the following to be a full, clear, and exact description of the invention, such as will enable others skilled in the art to which it appertains to make and use the same.

This invention relates to improvements in combined steering and driving axles for motor vehicles.

The object of the invention is to provide an improved universal joint connection between the ends of the front axle and the front wheel spindles, whereby said wheels may be both driven and steered.

A further object of the invention is to provide a joint of this character which will be simple, strong and durable in construction, reliable and efficient in operation and well adapted to the purpose for which it is designed.

With these objects in view, the invention consists of certain novel features of construction, combination and arrangement of parts as will be more fully described and particularly pointed out in the appended claims.

In the accompanying drawings, Figure 1 is a perspective view of one end of the axle and a portion of one wheel of a motor vehicle, showing the application of the invention; Fig. 2 is a longitudinal vertical sectional view of the ball and socket joint of the axle; Fig. 3 is a vertical cross sectional view of the same; and Fig. 4 is an inner side view of the guard ring forming part of the socket.

Referring more particularly to the drawings, 1 denotes the front or steering axle of the vehicle, on the outer end of which is rigidly mounted the socket member, 2, of a universal joint connection, the ball member, 3, of which is rigidly mounted on the inner end of the wheel spindle, 4, on the outer end of which is fixedly mounted the front supporting wheels, 5, of the vehicle.

The ball member, 3, of the joint comprises a solid spherical central portion 6, around which is formed a series of longitudinally disposed radially projecting ribs, 7, the ends of which connect with annular bosses, 8, formed on the opposite sides or ends of the ball. The socket, 2, comprises an inner hemi-spherical portion, 9, having on its outer edge a radially projecting flange, 10, to which is bolted or otherwise connected, a guard ring, 12, by means of which the ball and socket are held in operative engagement.

The adjacent inner corners of the outer edge of the socket section 9 and the guard ring 12 are cut away to form an annular ball race, 13, in which is disposed a series of anti-friction bearing balls, 14, adapted to engage or roll on the outer surface of the spherical body portion, 6, of the ball between the ribs, 7, formed thereon, two of said balls being preferably disposed between each pair of ribs, and in the ball race, 13, between each of the two balls arranged between the pairs of ribs, is formed a stop block, 15, said blocks, in conjunction with the ribs 7, forming stops which prevent the socket from turning on the ball and cause the latter to be rotated by or with said socket.

The rotation of the ball 3 by the socket being imparted to the forward wheels 5 through the spindles 4, which are fixedly connected to the balls and wheels, thus providing for the driving of the forward wheels irrespective of the angle to which the same are turned.

In connection with the joint I provide a supporting yoke, 16, which consists of an inner axle-engaging section 17 and an outer spindle-engaging section, 18, said sections being in substantially semi-circular form and are pivotally connected together at their inner ends by means of pivot bolts, 19, whereby they are adapted to swing freely on each other. The sections 17 and 18 of the yoke are provided with centrally disposed bearing balls, 21, through which the axle and spindles pass, thereby providing an anti-frictional bearing between said sections of the yoke and the axle and spindles.

On one side of the spindle section 18 of the yoke is pivotally connected the outer end of a steering rod, 22, by means of which the spindles and the parts connected thereto are turned, thus guiding the vehicle in the desired direction.

Having thus fully described my invention, what I claim as new and desire to secure by Letters Patent, is:

1. In a combined steering and driving axle for motor vehicles, the combination with an axle having on its opposite ends socket members, of wheel spindles having on their inner ends ball members adapted to engage said sockets on the ends of the axle, anti-frictional bearing balls arranged between said ball and socket, means to lock said socket against revolution on said ball, whereby the latter and the spindle connected thereto are driven by said axle irrespective of the angle at which said spindles are turned, and a supporting yoke connected to said axle and spindle, substantially as described.

2. In a device of the character described, the combination with a driving axle, of wheel spindles arranged at each end thereof, a ball and socket connection between the outer ends of the axle and the inner ends of said spindles, means to lock the socket against revolution on the ball member of said connection, whereby the spindles are driven by the axle at various angles, a supporting yoke comprising an axle section and a spindle section, and means to pivotally connect the inner ends of said sections, substantially as described.

3. In a device of the character described, the combination with the driving axle, with spindles arranged at the opposite ends of said axle, a ball and socket joint connection arranged between the ends of the axle and the spindle, said connection comprising a socket member fixedly mounted on the end of the axle, a ball member fixedly mounted on the inner end of the spindle and adapted to engage said socket member, a guard ring to hold said ball in operative connection with the socket, an annular ball race formed in the inner side of said socket, anti-frictional bearing balls arranged in said race and adapted to engage said ball member, and means arranged in said ball race and on said ball to form stops to prevent the turning of the socket on the ball, whereby the latter and said wheel spindles are driven by the axle through said socket, substantially as described.

4. In a device of the character described, the combination with a driving axle, of wheel spindles arranged at the opposite ends of said axle, a universal joint connection between said spindles and the axle, said connection comprising a socket member fixedly mounted on the end of the axle, a guard ring forming part of said socket and detachably connected thereto, a ball member adapted to be operatively engaged with said socket, said ball member comprising an inner spherical portion, a series of radially projecting ribs formed on said spherical portion, an annular ball race formed on the inner side of said socket, a series of anti-frictional bearing balls arranged in said race between the ribs on said ball, stop blocks arranged in said race between said bearing balls, said ribs and blocks forming stops to lock the socket against rotation on said ball, thereby providing for the driving or turning of the latter, and the spindles mounted thereon, substantially as described.

In testimony whereof I have hereunto set my hand in presence of two subscribing witnesses.

JAMES P. CARPENTER.

Witnesses:
R. A. BARBER,
J. LU PATTS.